United States Patent
Heimberg et al.

(10) Patent No.: US 6,764,771 B1
(45) Date of Patent: Jul. 20, 2004

(54) PRODUCT, ESPECIALLY A GAS TURBINE COMPONENT, WITH A CERAMIC HEAT INSULATING LAYER

(75) Inventors: Beate Heimberg, Mulheim a.d. Ruhr (DE); Wolfram Beele, Ratingen (DE); Karl Kempter, Munich (DE); Ulrich Bast, Munich (DE); Thomas Haubold, Wehrheim (DE); Michael Hoffmann, Ettlingen (DE); Axel Endriss, Stuttgart (DE); Peter Greil, Weisendorf (DE); Chu-Wan Hong, Stainz (AT); Fritz Aldinger, Leinfelden-Echtingen (DE); Hans J. Seifert, Stuttgart (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/530,653

(22) PCT Filed: Nov. 3, 1998

(86) PCT No.: PCT/DE98/03207

§ 371 (c)(1),
(2), (4) Date: Dec. 22, 2000

(30) Foreign Application Priority Data

Nov. 3, 1997 (DE) .......................................... 197 48 537

(51) Int. Cl.[7] .............................................. C23C 30/00
(52) U.S. Cl. ...................... 428/472; 428/469; 428/697; 428/701; 428/702; 428/699
(58) Field of Search ................................ 428/469, 472, 428/697, 701, 702, 699

(56) References Cited

U.S. PATENT DOCUMENTS

| | | | |
|---|---|---|---|
| 3,955,616 A | * 5/1976 | Gigliotti et al. | ............ 164/361 |
| 4,191,720 A | * 3/1980 | Pasco et al. | ................... 264/43 |
| 4,321,311 A | * 3/1982 | Strangman | |
| 4,564,555 A | * 1/1986 | Hornberger | |
| 4,588,607 A | * 5/1986 | Matarese et al. | ............. 427/34 |
| 4,676,994 A | 6/1987 | Demaray | |
| 4,913,980 A | * 4/1990 | Rowcliffe et al. | |
| 5,061,674 A | * 10/1991 | Muan et al. | ................. 502/324 |
| 5,310,575 A | * 5/1994 | Friese et al. | ............. 427/126.3 |
| 5,340,783 A | * 8/1994 | Anderson et al. | |
| 5,466,280 A | * 11/1995 | Lee et al. | ................. 106/14.12 |
| 5,629,251 A | * 5/1997 | Miyata | ......................... 148/28 |
| 5,660,885 A | * 8/1997 | Hasz et al. | ................. 427/377 |
| 5,773,141 A | * 6/1998 | Hasz et al. | ................. 428/469 |
| 5,840,380 A | * 11/1998 | Kimura et al. | |
| 5,917,189 A | * 6/1999 | Hasz et al. | ................. 428/472 |
| 6,127,048 A | * 10/2000 | Beele | ......................... 428/623 |

FOREIGN PATENT DOCUMENTS

| | | | |
|---|---|---|---|
| EP | 185603 | * | 6/1986 |
| JP | 63274751 | * | 11/1988 |

* cited by examiner

Primary Examiner—Archene Turner

(57) ABSTRACT

The invention relates to a product (1), particularly a gas turbine blade that can be exposed to a hot aggressive gas (7). The product (1) has a metallic basic body (2), which is provided with a thermal barrier coating (4) having a spinel of the composition $AB_2O_4$.

9 Claims, 2 Drawing Sheets

PRODUCT, ESPECIALLY A GAS TURBINE COMPONENT, WITH A CERAMIC HEAT INSULATING LAYER

FIELD OF THE INVENTION

The invention relates to a product that can be exposed to a hot aggressive gas, with a metallic basic body provided with a bond coat forming a bonding oxide and a ceramic thermal barrier coating. The invention furthermore relates to components that can be subjected to a hot gas in thermal machines, particularly in a gas turbine, which are provided with a thermal barrier coating to protect them against a hot aggressive gas.

BACKGROUND

U.S. Pat. No. 4,585,481 discloses a protective coating to protect a metallic substrate made of a superalloy against high-temperate oxidation and corrosion. A MCrAlY alloy is used for these protective coatings. This protective coating has 5% to 40% chromium, 8% to 35% aluminum, 0.1% to 2% of an oxygen active element selected from Group IIIb of the periodic system, including the lanthanides and actinides and mixtures thereof, 0.1% to 7% silicon, 0.1% to 3% hafnium, and a balance comprising nickel and/or cobalt (the percentages indicated are weight percent). The corresponding MCrAlY alloy protective coatings according to U.S. Pat. No. 4,585,481 are applied by plasma spraying.

U.S. Pat. No. 4,321,310 describes a gas turbine component with a basic body made of a nickel-based MAR-M-200 superalloy. A MCrAlY alloy layer is applied to the base material, particularly a NiCOCrAlY alloy with 18% chromium, 23% cobalt, 12.5% GB 745 257 A discloses a process for coating a metal or another material with stable metal oxides. The other materials indicated, which may be used as a substrate for a coating, are ceramic materials and graphite. Various spinels, e.g., chromite FeO●$Cr_2O_3$, chrysoberyl BeO●$Al_2O_3$, gahnite $ZuAl_2O_4$, geikielite (Mg, Fe) O●$TiO_2$ and MgO●$Al_2O_3$ (aluminate spinel) are applied as the coating material to the substrate by means of thermal spraying. With this process, the aforementioned minerals are sprayed, for example, onto the turbine blades of aircraft engines. aluminum, 0.3% yttrium and a balance of nickel. This MCrAlY alloy layer has a polished surface to which an aluminum oxide layer is applied. A ceramic barrier coating with a columnar structure is applied to this aluminum oxide layer. Due to this columnar microstructure of the thermal barrier coating, the crystallite columns are perpendicular to the surface of the basic body. The ceramic material specified is stabilized zirconium oxide.

U.S. Pat. No. 5,236,787 discloses the insertion of an interlayer of a metal-ceramic mixture between the basic body and a ceramic thermal barrier coating. This is intended to cause the metallic proportion of this interlayer to increase toward the basic body and to decrease toward the thermal barrier coating. Conversely, the ceramic proportion is to be low near the basic body and high near the thermal barrier coating. The thermal barrier coating specified is a zirconium oxide stabilized with yttrium oxide with components of cerium oxide. With this interlayer an adaptation oft the different thermal expansion coefficients between the metallic basic body and the ceramic thermal barrier coating is to be achieved.

EP 0 486 489 B1 discloses a corrosion resistant protective coating for intermediate and high temperatures of up to approximately 1050° C. for a gas turbine component made of a nickel-base or cobalt-base alloy. The protective coating has (in percent by weight) 25% to 40% nickel, 28% to 32% chromium, 7% to 9% aluminum, 1% to 2% silicon, and 0.3% to 1% of at least one reactive rare earth element, at least 5% cobalt, and optionally 0% to 15% of at least one of the elements of the group consisting of rhenium, platinum, palladium, zirconium, manganese, tungsten, titanium, molybdenum, niobium, iron, hafnium and tantalum. In a concrete embodiment, the protective coating contains the elements nickel, chromium, aluminum, silicon, yttrium, and rhenium in a range of 1% to 15% and a balance of cobalt. The addition of rhenium clearly enhances the corrosion protective properties.

WO 96/34128 A1 discloses a product, particularly a gas turbine blade, with a metallic substrate. A protective coating system comprising a bond coat and a thermal barrier coating is applied to the metallic substrate. The thermal barrier coating consists of a columnar ceramic oxide, particularly made of a partially stabilized zirconium oxide. This thermal barrier coating is bonded to the metallic substrate via an anchoring layer. The anchoring layer in turn is bonded via the bond coat to the metallic substrate, particularly a nickel-based or cobalt-based superalloy. The bond coat consists of a MCrAlY alloy, such as indicated, for example, in U.S. Pat. Nos. 5,154,885; 5,268,238; 5,273,712, and 5,401,307. The anchoring layer for its part consists of a spinel comprising aluminum and an other metallic element. The other metallic element is preferably zirconium. The anchoring layer is preferably applied by means of a PVD process, particularly an electron beam PVD process, in an oxygen-containing atmosphere. During the coating operation, the metallic substrate is kept at a temperature of above 700° C. The thickness of the anchoring layer is preferably less than 25 $\mu$m.

WO 96/31293 A1 describes a protective coating system for a gas turbine blade that is applied to a superalloy component for protection. The protective coating system comprises a zirconium oxide-based thermal barrier coating. To this zirconium oxide-based thermal barrier coating, a wear coat is applied that is to prevent premature damage to the thermal barrier coating. Such premature wear of the unprotected thermal barrier coating occurs due to contact with a hot aggressive gas containing oxides of calcium or magnesium. The wear layer has a composition that reacts with the oxides in the hot aggressive gas, which increases the melting temperature and the viscosity of the wear layer. For this purpose, the wear layer comprises, for example, aluminum oxide, magnesium oxide, chromium oxide and a spinel, e.g., magnesium-aluminum oxide.

U.S. Pat. No. 5,466,280 (corresponding to GB 2 286 977 A1) discloses a composition for an inorganic coating applied to a low alloy steel and resistant to high temperatures. The predominant property of the coating is that it provides increased corrosion resistance by incorporating iron into the coating. The coating is created by converting different metal oxides, such as magnesium oxide, aluminum oxide, iron oxide and calcium oxide at temperatures of above 1000° C. into spinels, which are not further specified.

German Application 15 83 971 discloses a refractory protective layer for metallurgical furnaces, which protective layer has a spine), namely MgO—$Al_2O_3$. German Patent 37 37 215 discloses a protective coating containing spinel (MgO—$Al_2O_3$) for an electrochemical sensor to determine the oxygen content in gases, particularly exhaust gases of internal combustion engines of automobiles.

EP 0 684 322 A2 discloses a MgO—$SiO_2$ and/or MgO—$Al_2O_3$ based ceramic coating made particularly of forsterite ($Mg_2SiO_4$), spinel ($MgAl_2O_4$) or cordierites ($2MgO-2Al_2O_3-5SiO_3$).

The object of the invention is to define a product, particularly a component of a gas turbine, with a metallic basic body and a thermal barrier coating disposed thereon.

SUMMARY OF THE INVENTION

The invention is based on the finding that currently used ceramic thermal barrier coatings, despite the use of, e.g., partially stabilized zirconium oxide, have a thermal expansion coefficient which at maximum is only about 70% of the thermal expansion coefficient of the metallic basic body used, particularly of a superalloy. This lower thermal expansion coefficient of the zirconium oxide thermal barrier coatings compared to the metallic basic body causes thermal stresses during exposure to a hot gas. To counteract such resultant stresses occurring under alternating thermal stress, an expansion-tolerant microstructure of the thermal barrier coating is required, e.g., by adjusting a corresponding porosity or a columnar structure of the thermal barrier coating.

The use of a spinel provides a thermal barrier coating, possibly taking into account mixed crystal formation and microstructure modification, with a high thermal expansion coefficient, low thermal conductivity, a high melting point, high chemical stability, a reduced tendency toward sintering, and a high phase stability.

According to the invention, the product-related object is attained in that the thermal barrier coating has a spinel of the composition $AB_2X_4$, where X represents oxygen, sulfur, selenium and/or tellurium. A represents an element or several elements of the group comprising aluminum, magnesium, manganese, iron, cobalt, nickel, copper, zinc, cadmium, silicon, titanium and tungsten. B represents one or several elements of the group comprising aluminum, magnesium, manganese, iron, vanadium, chromium, gallium, silicon, titanium, sodium and potassium.

The thermal barrier coating is bonded to the basic body either directly or indirectly via a bond coat. Bonding is preferably effected via an oxide layer that is formed, for example, by oxidation of the basic body or of the bond coat. Bonding can also or additionally be effected through mechanical anchoring, e.g., through roughness of the basic body or the bond coat.

Such a thermal barrier coating particularly serves to prolong the life of products that are subjected to a hot gas, e.g. gas turbine components, blades and heat shields. It exhibits low thermal conductivity, a high melting point, and is chemically inert.

BRIEF DESCRIPTION OF THE DRAWINGS

The invention will now be described in greater detail, by way of example, with reference to the drawing in which.

DESCRIPTION OF THE PREFERRED EMBODIMENT

Figure 2:
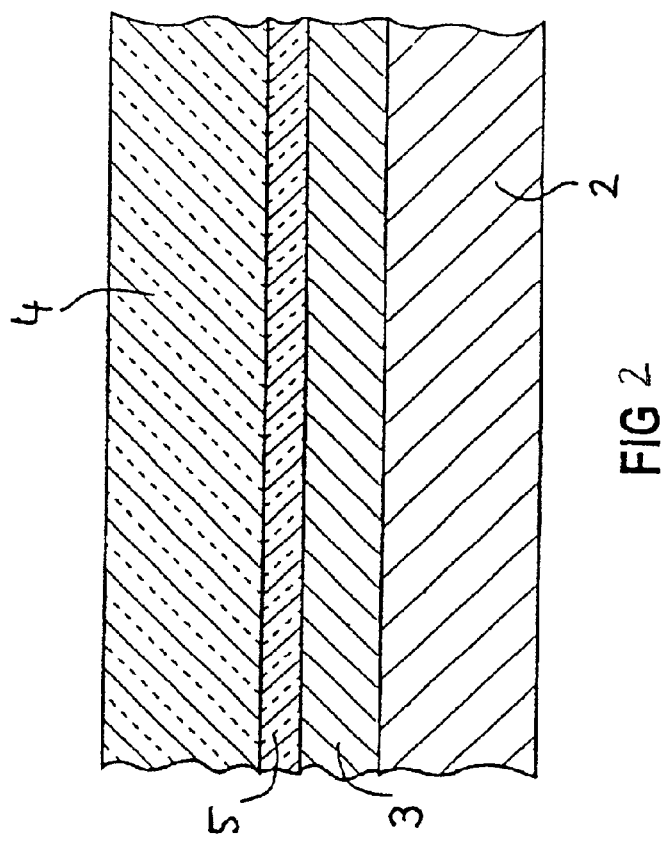
FIGS. 2 and 3 are each a segment of a cross-section through the turbine blade depicted in FIG. 1.

The invention is based on the finding that currently used ceramic thermal barrier coatings, despite the use of, e.g., partially stabilized zirconium oxide, have a thermal expansion coefficient which at maximum is only about 70% of the thermal expansion coefficient of the metallic basic body used, particularly of a superalloy. This lower thermal expansion coefficient of the zirconium oxide thermal barrier coatings compared to the metallic basic body causes thermal stresses during exposure to a hot gas. To counteract such resultant stresses occurring under alternating thermal stress, an expansion-tolerant microstructure of the thermal barrier coating is required, e.g., by adjusting a corresponding porosity or a columnar structure of the thermal barrier coating. In a zirconium oxide-based thermal barrier coating, continuous sintering of the coating material furthermore takes place during operation [missing verb] a change in the microstructure, disappearance of the porosity, occurrence of new defects or cracks, and possible failure of the thermal barrier coating in thermal and mechanical respects. In addition, in a thermal barrier coating of partially stabilized zirconium oxide by means of stabilizers such as yttrium oxide, cerium oxide or lanthanum oxide, stresses may occur that are created due to a thermally associated phase transition (tetragonal to monoclinic and cubic). Due to the associated volume change, a maximum permissible surface temperature for thermal barrier coatings made of zirconium oxide is given.

The use of a spinel provides a thermal barrier coating, possible taking into account mixed crystal formation and microstructure modification, with a high thermal expansion coefficient, low thermal conductivity, a high melting point, high chemical stability, a reduced tendency toward sintering, and a high phase stability.

According to the invention, the product-related object is attained in that the thermal barrier coating has a spinel of the composition $AB_2X_4$, where X represents oxygen, sulfur, selenium and/or tellurium. A represents an element or several elements of the group comprising aluminum, magnesium, manganese, iron, cobalt, nickel, copper, zinc, cadmium, silicon, titanium and tungsten. B represents one or several elements of the group comprising aluminum, magnesium, manganese, iron, vanadium, chromium, gallium, silicon, titanium, sodium and potassium.

The thermal barrier coating is bonded to the basic body either directly or indirectly via a bond coat. Bonding is preferably effected via an oxide layer that is formed, for example, by oxidation of the basic body or of the bond coat. Bonding can also or additionally be effected through mechanical anchoring, e.g., through roughness of the basic body or the bond coat.

Such a thermal barrier coating particularly serves to prolong the life of products that are subjected to a hot gas, e.g. gas turbine components, blades and heat shields. It exhibits low thermal conductivity, a high melting point, and is chemically inert.

It should be noted that the compound $MgAl_2O_4$ (magnesium aluminate) is already frequently termed the spinel. The term spinel, as used in the invention, signifies the aforementioned group of compounds of the general formula $AB_2X_4$. The term "spinel" is intended to mean the so-called normal spinels ($AB_2X_4$) as well as the "inverse" spinels ($B(AB)_2X_4$). In addition to the conventional spinels, in which X represents oxygen, material systems where X represents selenium, tellurium or sulfur are also included. In the normal spinel type, the oxygen atoms form a nearly cubic-dense lattice, in the tetrahedral vacancies of which there are 8 A atoms and in the octahedral vacancies of which there are 16 B atoms. In contrast, in what is known as an inverse spinel, 8 B atoms are present in tetrahedral and the remaining 8 B atoms and the 8 A atoms in octahedral coordination.

Preferably, the product has a spinel with oxygen. Here, A represents a metallic element of valence $2^+$ and B a metallic element of valence 3+ (so-called 2–3 spinels). In this class of spinels, A represents preferably magnesium, iron, zinc, manganese, cobalt, nickel, titanium, copper or cadmium, and B represents aluminum, iron, chromium or vanadium.

Preferably, the spinel has aluminum or chromium as the B element and magnesium, nickel, or cobalt as the A element.

Furthermore, the thermal barrier coating preferably has a spinel in which B represents magnesium and A titanium.

In addition to the aforementioned 2–3 spinels with the valence $A^{2+}$ and $B^{3+}$, there are other spinel types with a different valence of the cations, e.g., 1–6 spinels ($WNa_2O_4$) and 2–4 spinels (e.g. $Fe_2TiO_4$). In addition to the aforementioned elements that can represent the symbol A, aluminum, silicon, titanium and tungsten may also be used. B also comprises the elements magnesium, manganese, gallium, silicon, sodium and potassium.

The thermal conductivity of a preferred spinel is between 1.0 W/mK and 5.0 W/mK. The thermal expansion coefficient is preferably between $6 \times 10^{-6}$/K and $12 \times 10^{-6}$/K and the melting point is greater than 1600° C. The indicated ranges for expansion coefficient and thermal conductivity apply to bodies of a ternary oxide with and "ideal" cell structure in manufacturing terms, i.e., without specifically introduced porosities. For $MgAl_2O_4$, e.g., the melting point is approximately 2100° C., thermal conductivity is 4.0 W/mK at 1945° C. and the thermal expansion coefficient is 7.6 to $9.2 \times 10^{-6}$/K at temperatures between 25° and 1200° C. For $CoAl_2O_4$ the melting point is approximately 1955° C. and the thermal expansion coefficient is between 7 and $11 \times 10^{-6}$/K at temperatures of between 500° and 1500° C. For $MgCr_2O_4$ a melting point on the order of magnitude of 2400° C. applies, a thermal expansion coefficient of between 6.5 and $7.6 \times 10^{-6}$/k at 25° to 1200° C., and a thermal conductivity [W/mK] of 1.4 in the range of 25° to 300° C. For $CoCr_2O_4$ the melting point is above 1600° C. and the thermal expansion coefficient is between 7.5 and $8.5 \times 10^{-6}$K at 500° to 1500° C. The compound $TiMg_2O_4$ has a melting point of 1835° C. and a thermal expansion coefficient of 6 to $12 \times 10^{-6}$/K in the range of 500° to 1500° C.

Preferably, the spinet is present as a mixture in the ternary system of the type $AB_2X_4$—$AX$—$B_2X_3$. A metallic mixed oxide system with the spinel and an additional compound, particularly an oxide, may also be present. The spinet, or the spinel present as a mixture, can have an oxide or several oxides of the group comprising NiO, CoO, $Al_2O_3$ and $Cr_2O_3$. This can be the case even if said oxides are not already a component of the spinel. In particular, said oxides can be present in an aluminate or a chromate spinel.

Furthermore, the spinel or a spinel consisting of a mixture can have an oxide or several oxides of the group comprising magnesium oxide (MgO), zirconium oxide ($ZrO_2$) and hafnium oxide ($HfO_2$). This can be the case with spinels in which the oxides MgO, $ZrO_2$ and $HfO_2$ are not already a component of the ternary system or the spinel, particularly with a chromate spinel or an aluminate spinet. A zirconium oxide or hafnium oxide present in the spinet is partially or fully stabilized particularly with yttrium oxide ($Y_2O_3$) or another rare earth oxide. A rare earth metal is hereby understood to mean, for short, one of the elements scandium, yttrium, lanthanum, as well as the lanthanides such as cerium and ytterbium. Furthermore, oxides of the actinides may also be added.

The bond coat has preferably an alloy that comprises at least one element of the spinet. Hence, through at least partial oxidation of the bond coat, an oxide is formed of this element that is also contained in the spinel, e.g., aluminum, chromium, cobalt or others to provide good adhesion of the spinel to the bond coat. The bond coat is preferably an alloy of the type MCrAlY, where M represents an element or several elements of the group comprising iron, cobalt or nickel, Cr represents chromium, Al aluminum, and Y yttrium or a reactive rare earth element. Furthermore, the bond coat can include, e.g., 1 to 15 wt-% rhenium. The chromium content preferably ranges from 3% to 50%, particularly from 12% to 25%, the aluminum content is preferably between 3% and 20%, particularly between 5% and 15%. The yttrium content is preferably between 0.01% and 0.3%.

The product is preferably a component of a thermal turbo machine, particularly a gas turbine. In particular, it is a turbine moving blade, a turbine stationary blade, or a heat shield of a combustion chamber. The metallic basic body preferably has a nickel-, cobalt- and/or chromium based superalloy. It is also possible to provide a furnace or similar component with a thermal barrier coating made of a spinel.

The advantage of the spinels is their high tolerance to impurities, e.g., due to the formation of simple or complex mixed crystals in the presence of iron, aluminum, nickel, chromium or other metals, a good characterization of the sintering behavior of the high-melting spinels, and an essentially cubic structure and therefore quasi isotropic thermal expansion. Spinels furthermore exhibit good chemical resistance, high thermal shock resistance and high strength. Even with a transition of a spinel from its normal form to the inverse form, or at least partially to the inverse form, there are no abrupt changes in the physical-chemical properties. The transition from normal to inverse spinel can thus be considered an order-disorder induced phase transition of the second order, which has no great influence on the properties of the thermal barrier coating.

Thermal barrier coatings with a spinel may be produced, for example, by simple plasma spraying. A thermal barrier coating with a corresponding porosity can be produced by atmospheric plasma spraying. Alternatively, the thermal barrier coating may be applied by means of vapor deposition, e.g., an electron beam PVD process, with an adjustable columnar structure.

Preferably, the thermal barrier coating is applied by atmospheric plasma spraying, particularly with a predefinable porosity. The metallic mixed oxide system may also be applied by means of a suitable vapor deposition process, a suitable PVD process (Physical Vapor Deposition), particularly a reactive PVD process. When the thermal barrier coating is applied by means of vapor deposition, e.g., an electron beam PVD process, a columnar structure can be achieved if required. In a reactive PVD process, a reaction, particularly a conversion, of the individual components of a ternary oxide or a pseudo ternary oxide takes place only during the coating operation, particularly directly upon striking the product. In non-reactive vapor deposition, the previously pre-reacted products, particularly the ternary oxides with a perovskite structure are evaporated and are then deposited from the vapor onto the product. The use of pre-reacted products is advantageous particularly if plasma spraying is used.

The production (synthesis) of the spinels, e.g., $NiCr_2O_4$, $NiAl_2O_4$ and $MgCr_2O_4$ can be carried out phase-shift-free in the "mixed oxide process." In this case, the starting powders used are the associated binary oxides, e.g., $Cr_2O_3$, NiO, $Al_2O_3$ and MgO. These powders can be homogenized under isopropanol, cold isostatically pressed, particularly at a pressure of 625 mPa, and subsequently tempered for 50 hours at 1500° C. in air at a heat rate of 5 K/min.

Figure 1:
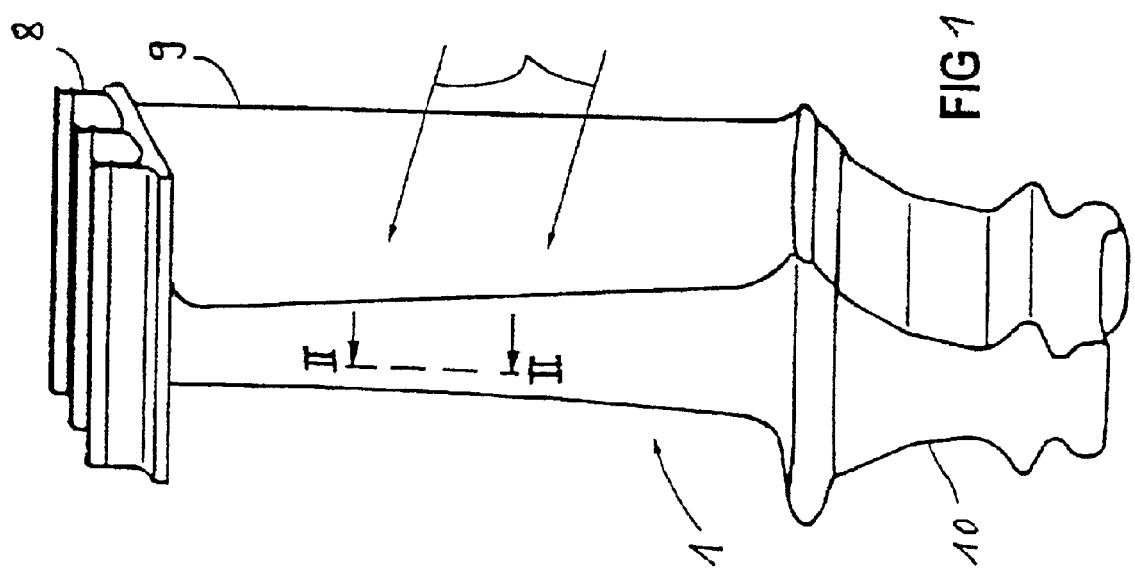
FIG. 1 is a perspective view of a gas turbine blade.

FIG. 1 shows a product 1, in this case a gas turbine blade 1, with a metallic basic body 2 made of a nickel-based, cobalt-based or chromium-based superalloy. The gas turbine blade 1 has a blade root 10 for mounting to a turbine shaft (not depicted), a vane 9 adjoining the blade root and a seal strip 8 bordering vane 9. At least on vane 9, gas turbine blade 1 is coated with a bond coat 3 (see FIGS. 2 and 3) and a thermal barrier coating 4 is applied thereto. Between the thermal barrier coating 4 and the bond coat 3, an oxide layer 5 is formed having an oxide of a metallic element of the alloy of bond coat 3. The bond coat has an alloy of the MCrAlY type, where M represents an element or several elements of the group comprising iron, cobalt and nickel, Cr represents chromium, Al aluminum, and Y yttrium or a rear earth element. The thermal barrier coating 4 applied to bond coat 3 has a spinel of the structural formula $AB_2O_4$, particularly a 2–3 spinel. The 2–3 spinel has a metallic element B, particularly chromium or aluminum, and an additional metallic element A, particularly magnesium, nickel or cobalt, e.g., $MgAl_2O_4$, $CoAl_2O_4$, $MgCr_2O_4$, $CoCr_2O$, or $TiMg_2O_4$. A 2–3 spinel can furthermore be present as a ternary system of the actual spinel and a respective oxide of a bivalent metallic element and a trivalent metallic element. Furthermore, an additional oxide, particularly MgO, $ZrO_2$, $HfO_2$, NiO, CoO, $Al_2O_3$ or $Cr_2O_3$ can be admixed to the spinel or to the spinel containing a mixture. Oxide layer 5 and bond coat 3 ensure good adhesion of the thermal barrier coating 4 to the metallic basic body 2.

Figure 3:
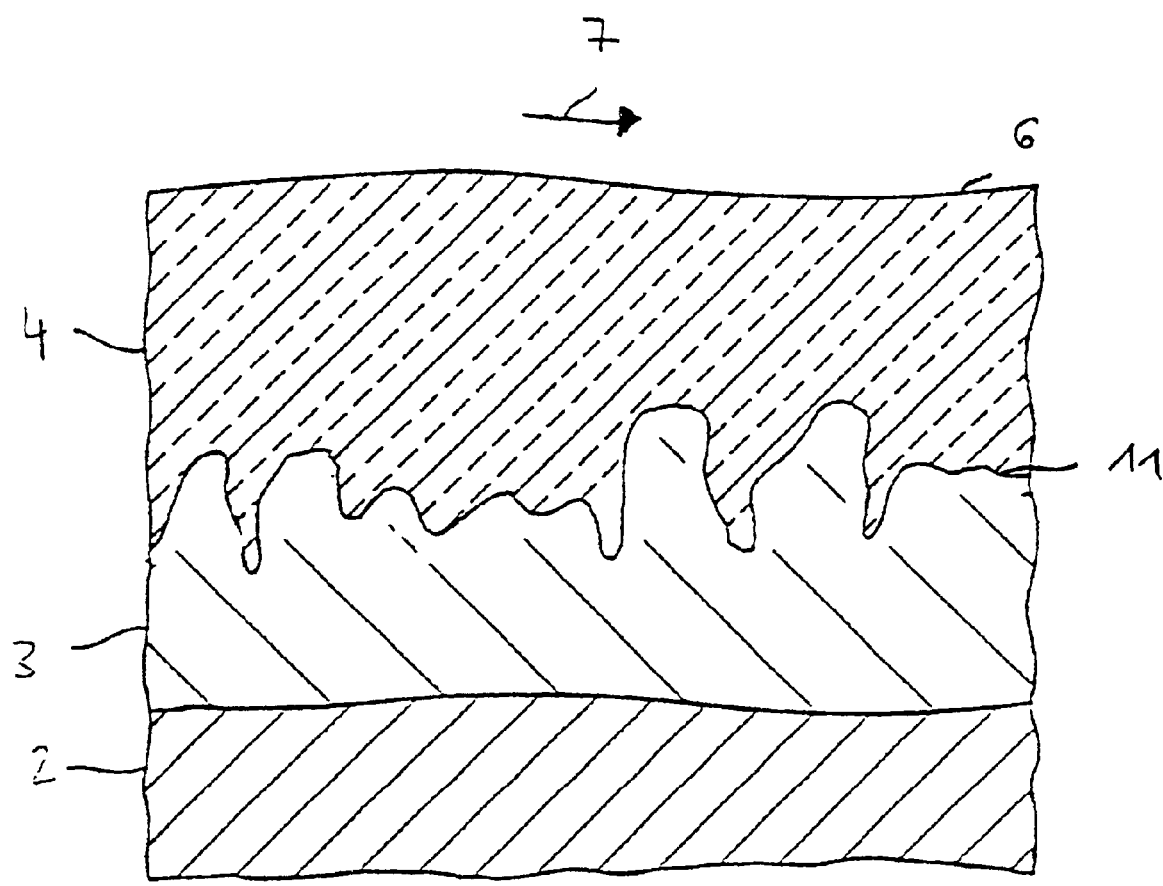

FIG. 3 shows a coating system analogous to that shown in FIG. 2 in which the basic body 2 is provided with a bond coat 3 to which the thermal barrier coating 4 is applied. Bond coat 3 has a rough surface, such that thermal barrier coating 4 essentially adheres to bond coat 3, and thus to basic body 2, without a chemical bond but through mechanical anchoring. This roughness of surface 11 of bond coat 3 can be provided already through the application of bond coat 3, e.g., by vacuum spraying. The thermal barrier coating 4 can also be applied directly to the metallic basic body 2 through a corresponding roughness of the metallic basic body 2. It is also possible to apply an additional bond coat between bond coat 3 and thermal barrier coating 4, e.g., with an aluminum nitride or a chromium nitride.

To ensure good and permanent adhesion, even when the product is exposed to a hot gas 7 during operation of the turbine system (not depicted), the high thermal expansion coefficient of the spinel, which is close to that of the thermal coefficient of the superalloy, achieves [sic]. The fact that the spinel has low thermal conductivity, a high melting point and no critical phase transition at the temperatures of the gas turbine system, which can reach more than 1250° C. on surface 6 of thermal barrier coating 4, further contributes to a permanent bond. This ensures a long service life even with alternating thermal stresses of gas turbine blade 1.

What is claimed is:

1. An article of manufacture comprising:

a metaillic substrate:

a thermal barrier coating disposed on the metallic substrate;

wherein the thermal barrier coating comprises a spinel material and an oxide material admixed to the spinel material, the oxide material selected from the group of MgO, $HfO_2$, NiO, CoO, and $Cr_2O_3$.

2. The article of manufacture of claim 1, wherein the spinel material is selected from the group of $CoMg_2O_4$, $CoFe_2O_4$, $CoCr_2O_4$, $CoTi_2O_4$, $CoAl_2O_4$, $NiMg_2O_4$, $NiTi_2O_4$, $TiMg_2O_4$, $TiFe_2O_4$, $TiCr_2O_4$, and $TiAl_2O_4$.

3. The article of manufacture of claim 1, wherein a first portion of the thermal barrier coating comprises a normal spinel material and a second portion of the thermal barrier coating comprises an inverse spinel material.

4. The article of manufacture of claim 1, wherein the spinel material is present as a mixture of the type $AB_2X_4$—$AX$—$B_2X_3$, where X represents an element or several elements of the group comprising oxygen, sulfur, selenium and tellurium, A represents an element or several elements of the group comprising aluminum, manganese, iron, cobalt, nickel, copper, zinc, cadmium, silicon, titanium and tungsten, and B represents an element or several elements of the group comprising aluminum, magnesium, manganese, iron, vanadium, chromium, gallium, silicon, titanium, sodium and potassium.

5. An article of manufacture comprising:

a metallic substrate;

a thermal barrier coating disposed an the metallic substrate;

wherein the thermal barrier coating comprises a spinel material selected from the group of $CoMg_2O_4$, $CoFe_2O_4$, $CoCr_2O_4$, $CoTi_2O_4$, $CoAl_2O_4$, $NiMg_2O_4$, $NiTi_2O_4$, $TiMg_2O_4$, $TiFe_2O_4$, $TiCr_2O_4$, and $TiAl_2O_4$.

6. The article of manufacture of claim 5, further comprising an oxide material admixed to the spinel material, the oxide material selected from the group of MgO, $HfO_2$, NiO, CoO, and $Cr_2O_3$.

7. The article of manufacture of claim 5, wherein the spinel material is present as a mixture of the type $AB_2X_4$—$AX$—$B_2X_3$, where X represents an element or several elements of the group comprising oxygen, sulfur, selenium and tellurium, A represents an element or several elements of the group comprising aluminum, manganese, iron, cobalt, nickel, copper, zinc, cadmium, silicon, titanium and tungsten, and B represents an element or several elements of the group comprising aluminum, magnesium, manganese, iron, vanadium, chromium, gallium, silicon, titanium, sodium and potassium.

8. An article of manufacture comprising:

a metallic substrate;

a thermal barrier coating disposed on the metallic substrate;

wherein a first portion of the thermal barrier coating comprises a normal spinel material and a second portion of the thermal barrier coating comprises an inverse spinel material.

9. The article of manufacture of claim 8, wherein the thermal barrier coating comprises a spinel material present as a mixture of the type $AB_2X_4$—$AX$—$B_2X_3$, where X represents and element or several elements of the group comprising oxygen, sulfur, selenium and tellurium, A represents an element or several elements of the group comprising aluminum, manganese, iron, cobalt, nickel, copper, zinc, cadmium, silicon, titanium and tungsten, and B represents an element or several elements of the group comprising aluminum, magnesium, manganese, iron, vanadium, chromium, gallium, silicon, titanium, sodium and potassium.

* * * * *